F. E. BOLAND.
AERONAUTIC APPARATUS.
APPLICATION FILED MAR. 18, 1910.
1,277,036.
Patented Aug. 27, 1918.
2 SHEETS—SHEET 2.
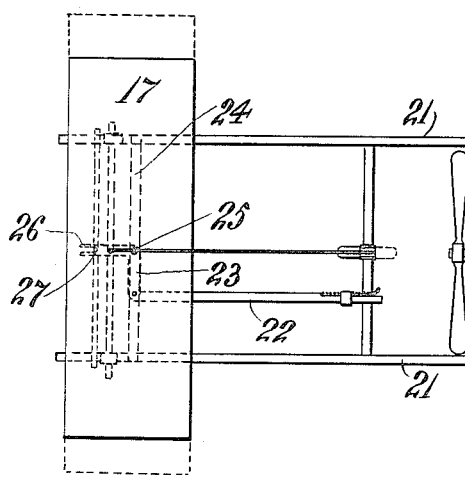
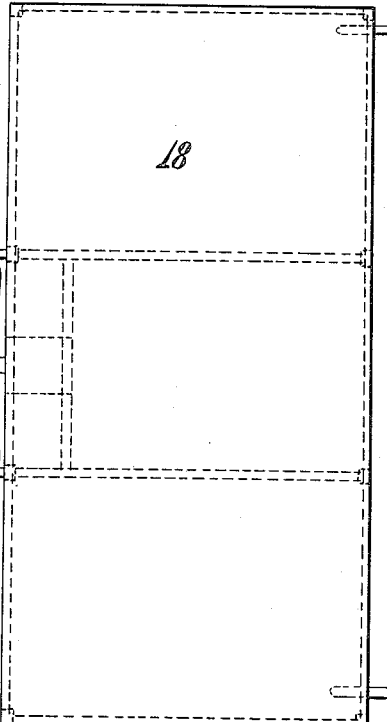
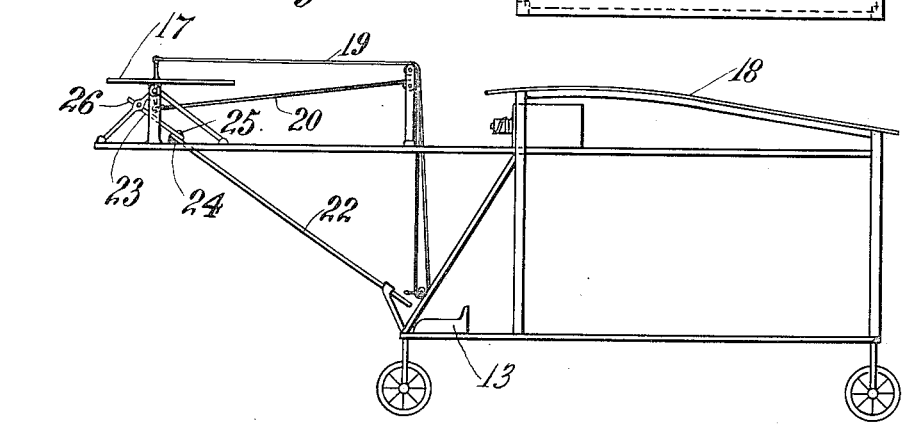
Witnesses:
Louise Enderle.
Francis E. Boland, Inventor
By his Attorney

UNITED STATES PATENT OFFICE.

FRANCIS E. BOLAND, OF RAHWAY, NEW JERSEY, ASSIGNOR TO BOLAND AEROPLANE & MOTOR COMPANY, OF NEW YORK, N. Y.

AERONAUTIC APPARATUS.

1,277,036.  Specification of Letters Patent.  Patented Aug. 27, 1918.

Application filed March 18, 1910. Serial No. 550,226.

*To all whom it may concern:*

Be it known that I, FRANCIS E. BOLAND, a citizen of the United States, residing at Rahway, in the county of Union and State of New Jersey, have invented certain new and useful Improvements in Aeronautic Apparatus, of which the following is a specification, reference being had therein to the accompanying drawing.

My invention relates to improvements in aeronautic apparatus and has particular reference to means for enabling such apparatus to turn while traveling in the air. To this end the invention is particularly adapted for use in an aeroplane and is so illustrated in the accompanying drawings wherein the biplane and monoplane type of construction is shown.

In the construction of aeroplanes heretofore various kinds of devices have been employed for the purpose of maintaining equilibrium while in flight so that when the machine becomes unbalanced the operator can, by actuating such device, restore the machine to horizontal balance. In my present invention I also am able to secure equilibrium of the machine but the device which I may employ has for its principal object an entirely different function. In machines wherein devices are used for maintaining balance and equilibrium it has been customary to employ in combination therewith a rudder, while according to my present invention this feature of the machine may be entirely eliminated. Instead of relying upon the rudder for turning I may throw the machine out of balance which in itself causes the machine to turn upon a more or less vertical axis and the means which I prefer to employ for throwing the machine out of balance may also be employed for establishing balance when it is desired to keep the machine upon a straight course. To this end the invention contemplates the use of means for throwing the machine out of balance at will.

Referring to the accompanying drawings, Figure 1 represents a biplane type of machine in perspective illustrated in the form of a glider. Fig. 2 is a plan view of a monoplane aeroplane and Fig. 3 a side elevation of the same.

4 and 5 are the upper and lower supporting surfaces respectively of the biplane glider held in position in any suitable manner and 6 and 7 are controlling surfaces mounted preferably at the lateral extremities of the supporting surfaces substantially as illustrated upon axes such as 8 and 9 extending diagonally between the lateral extremities of said supporting surfaces. These controlling surfaces may be retained by suitable resilient means such as the springs 10 and 11 in the position illustrated and the diagonally opposite corners thereof are preferably connected by the taut rope, wire, or cable such as 12 which may pass beneath the seat of the operator as illustrated or be run in any suitable and convenient manner with reference to the construction of the machine. 13 is the seat of the operator. When the glider has been launched and is in free flight and the operator desires to turn, he can, by pulling upon one side of the rope 12, cause the controlling surface on that side of the machine to revolve upon its diagonal axis thereby presenting a resistance to that side of the machine to its forward movement thereby reducing the speed of that side, causing it to sink and causing the opposite side of the machine to speed ahead turning the machine as a whole. It will be observed that the controlling surface not only presents resistance to the forward progress of the side of the machine upon which it is operated but also offers resistance to movement of the machine as a whole in the direction in which it sank. It will of course be readily understood that this applies to either side of the machine so that it is possible to turn the machine to the right or left, in circles or otherwise. It will also be understood that when running in straight line of flight any tendency of the machine to drop on one side can be corrected by the operator pulling the controlling plane on the opposite side by retarding the rising side of the machine until the declining side has had opportunity to elevate and until the machine has resumed its horizontal and balanced position. 14 and 15 are suitable stops to keep the controlling planes in normal position except when in use by the operator.

In a modification of the invention it may be found preferable to destroy the horizontal balance of the machine by shifting the center of weight rather than by controlling the speed of travel of the sides of the machine. A suitable method of accomplishing this is disclosed in the monoplane illustrated in Figs. 2 and 3. In said figures, 17 is what is generally known as the elevating plane of the machine and 18 is the main plane which is preferably so constructed and apportioned as to carry say five times the weight of the elevating plane, said elevating plane being adapted to carry about one-fifth of the total weight of the machine. The elevating plane is adjusted by the usual ropes 19 and 20 within convenient reach of the operator or by any suitable means. This plane is preferably mounted upon a suitable framework such as 21 projecting forwardly from the machine and is adapted to slide from side to side thereupon by operating the lever 22 also within convenient reach of the operator which is pivotally connected to the crank 23 which is pivotally mounted upon the cross brace 24 at 25. This crank 23 terminates in the fork 26 which engages the pin 27 of the elevating plane 17 thereby insuring the lateral movement of the elevating plane when the lever is operated. From this it will be seen that the center of weight can be shifted from side to side of the machine rapidly and with little effort thereby causing either side of the machine to fall at will while the machine is in flight. This naturally causes the machine to turn in the direction in which it has fallen after which by throwing the center of weight slightly to the other side of the machine, the balance of the machine is easily corrected. Of course it will be understood that there are various other methods by which these results may be accomplished. Efforts heretofore have been made to avoid the very thing which this invention is calculated to bring about, namely throwing the machine out of balance while turning. With a machine constructed under this principle the turning is the consequence of the unbalanced condition whereas in the machines in use the unbalanced condition is the inevitable result of turning although partially compensated for by the coöperation of suitable rudder contrivances. The invention therefore has for its object among other things the complete abolition of the rudder and of all balancing wing-tips or auxiliary planes and does not require warping, bending, twisting, distorting or other manipulation of the main surfaces.

Having described my invention, what I claim as new and desire to secure by Letters Patent, is:

1. An aeroplane including in combination, a main horizontal plane; a vertical plane adjacent each end of said horizontal plane; and means for swinging each of said vertical planes about a diagonal axis extending from one edge of said plane to a point in vertical alinement with the opposite edge of said plane.

2. An aeroplane including in combination a main horizontal plane, a coöperating vertical plane, and means for swinging diagonally opposite corners of said vertical plane about a diagonal axis connecting the other two corners.

3. An aeroplane including in combination spaced horizontal planes arranged one above the other; a vertical plane located between said horizontal planes and adjacent each end thereof, and means for swinging each of said vertical planes about an axis extending in an inclined direction from a point in vertical alinement with the edges on one side of the horizontal planes, to a point in vertical alinement with the opposite edges of said horizontal planes.

4. An aeroplane including in combination superposed parallel supporting planes, a vertical plane at each lateral end pivoted on axes extending diagonally between the upper and lower supporting planes, and means for operating the vertical planes.

5. A steering device for aeroplanes, consisting of the combination with an aeroplane, of a rudder at each side thereof pivoted on an oblique axis that points upward and backward, said rudder being larger at the rear than at the front, and operating means for controlling said rudders.

In testimony whereof I affix my signature in presence of two witnesses.

FRANCIS E. BOLAND.

Witnesses:
 LOUISE ENDERLE,
 THOMAS A. HILL.